United States Patent [19]
Okabe et al.

[11] Patent Number: 6,099,982
[45] Date of Patent: Aug. 8, 2000

[54] STARTING POWDERS FOR ITO PRODUCTION, ITO SINTERS AND PROCESSES FOR PRODUCING SUCH STARTING POWDERS AND ITO SINTERS

[75] Inventors: Katsuaki Okabe; Tsuyoshi Nishimura, both of Honjo; Shinji Sato, Omonogawa-machi; Kohichiro Eshima, Honjo; Kouki Toishi, Honjo; Choju Nagata, Honjo, all of Japan

[73] Assignee: Dowa Mining Co., Ltd., Tokyo, Japan

[21] Appl. No.: 08/966,936

[22] Filed: Nov. 10, 1997

[30] Foreign Application Priority Data

Nov. 8, 1996 [JP] Japan .................................... 8-312916
Nov. 6, 1997 [JP] Japan .................................... 9-320352

[51] Int. Cl.⁷ ................................................... C01G 19/00
[52] U.S. Cl. ......................... 428/697; 428/699; 428/701; 428/702; 252/518; 252/520.1
[58] Field of Search ................................. 252/518, 520.1, 252/323; 428/325, 697, 699, 701, 702

[56] References Cited

U.S. PATENT DOCUMENTS

| | | |
|---|---|---|
| 5,071,800 | 12/1991 | Iwamoto et al. . |
| 5,104,498 | 4/1992 | Pegouret . |
| 5,435,826 | 7/1995 | Sakakibara et al. ..................... 501/134 |
| 5,480,532 | 1/1996 | Schlott et al. ........................... 501/134 |
| 5,580,496 | 12/1996 | Yulinobu et al. ....................... 252/518 |
| 5,700,418 | 12/1997 | Hormann et al. ........................ 65/17.3 |
| 5,866,493 | 2/1999 | Lee et al. ................................ 501/134 |

FOREIGN PATENT DOCUMENTS

| | | |
|---|---|---|
| 54-45697 | 4/1979 | Japan . |
| 62-21752 | 1/1987 | Japan . |
| 62-7627 | 1/1987 | Japan . |
| 63-198862 | 8/1988 | Japan . |
| 1-212787 | 8/1989 | Japan . |
| 1-290527 | 11/1989 | Japan . |
| 5-148638 | 6/1993 | Japan . |
| 5-193939 | 8/1993 | Japan . |
| 6-68935 | 8/1994 | Japan . |
| 7-29770 | 4/1995 | Japan . |
| 7-42109 | 5/1995 | Japan . |

OTHER PUBLICATIONS

J. Lambert Bates, Curtis W.Griffin, David D. Marchant and John E. Garnier, "Electrical Conductivity, Seebeck Coefficient, and Structure of $In_2O_3$–$SnO_2$", *American Ceramic Society Bulletin*, 65(4), 673–678(1986).

*Primary Examiner*—Archene Turner
*Attorney, Agent, or Firm*—Frishauf, Holtz, Goodman, Langer & Chick, P.C.

[57] ABSTRACT

The starting salts for ITO production, precipitant and the conditions for reaction, calcination, etc. are specified such as to synthesize a starting oxide adapted to be free from volatile components such as halides and lower oxides; the starting oxide is dispersed to particles having a specified flowability; the powder is pressed into a compact, which is sintered in either air atmosphere or an oxygen-rich atmosphere to produce a large and high-density sinter for use as an ITO sputtering target.

12 Claims, No Drawings

STARTING POWDERS FOR ITO PRODUCTION, ITO SINTERS AND PROCESSES FOR PRODUCING SUCH STARTING POWDERS AND ITO SINTERS

BACKGROUND OF THE INVENTION

1. Field of the Invention

This invention relates to starting powders for producing ITO sputtering targets that are useful in the formation of transparent, electrically conductive films, as well as sintered ITO. The invention also relates to processes for producing such starting powders and ITO sinters.

2. Background Information

Indium-tin oxide (ITO) sputtering targets are used in the formation of transparent, electrically conductive films. Such targets are customarily produced by sintering a compact of a tin oxide containing indium oxide powder which is either a mixture of indium oxide and tin oxide powders or derived from a coprecipitated powder. Examples of the starting materials for ITO production include an indium oxide powder, a tin oxide powder, a mixture of indium oxide and tin oxide powders, and a tin oxide containing indium oxide powder derived from a coprecipitated powder. To prepare an indium oxide powder, an aqueous solution of an indium salt as a starting material for synthesis is reacted with aqueous ammonia or an alkali hydroxide such as sodium hydroxide to make indium hydroxide, which is washed with water, dried and sintered. If a tin salt is incorporated in the aqueous indium salt solution, a tin-containing coprecipitated powder will result and from this powder, a tin oxide containing indium oxide powder can also be obtained.

The tin content of ITO is variable with the conditions of film formation and the desired film characteristics; typically, it ranges from 2 to 20 wt %, particularly from 5 to 15 wt %, in terms of $SnO_2$.

Various methods have been proposed in association with the preparation of the starting powders for ITO production. Unexamined Published Japanese Patent Application No. 45697/1979 teaches a method in which succinic acid and urea are added as precipitants to thereby produce a powder having improved dispersibility; Unexamined Published Japanese Patent Application No. 7627/1987 teaches a method in which a precipitate is washed with an organic solvent such that a dried powder will have improved dispersibility; Unexamined Published Japanese Patent Application No. 199862/1988 teaches a method for direct oxidation of an In-Sn alloy; unexamined Published Japanese Patent Application No. 21752/1987 teaches a method in which a starting powder is heat treated at high temperature to thereby remove the volatile components, followed by sintering; Unexamined Published Japanese Patent Application No. 290527/1989 teaches a method in which the water in a precipitate is replaced by an organic solvent in order to produce a dried powder having improved dispersibility; Unexamined Published Japanese Patent Application No. 212787/1989 teaches an indium formate powder as a starting material for ITO film; Unexamined Published Japanese Patent Publications No. 193939/1993 and No. 29770/1995 and Examined Japanese Patent Publication No. 68935/1994 teach methods for producing high-density sinters from powders having specified characteristics; Examined Japanese Patent Publication No. 42109/1995 teaches a method for producing a high-density sinter under specified conditions for precipitation which is effected during synthesis of a powder; and Unexamined Published Japanese Patent Application No. 148638/1993 teaches a method in which the particle size of a starting powder and the oxygen pressure for sintering are adjusted such as to produce a high-density sinter.

Other proposals for the production of high-density sinters include hot pressing, HIP (hot isostatic pressing) and other methods in which pressure is applied under hot conditions to allow for an increase in the density of the sinter being formed.

A problem with the prior art is that when hydroxides are heat treated to be converted to oxides by the method of powder synthesis using organic reagents, lower oxides of indium and tin may potentially form. In addition, with a view to producing high-density sinters, Unexamined Published Japanese Patent Application No. 193939/1993, Examined Japanese Patent Publication No. 29770/1995 and Examined Japanese Patent Publication No. 68935/1994 specify the characteristics of powders such as the specific surface area as measured by the BET method and the average particle size; however, none of these patents refer to the presence and possible effects of substances such as halogens and lower oxides (e.g. tin oxide) that may potentially evaporate during sintering. The methods of producing high-density sinters by applying increased pressure under hot conditions as by hot pressing or HIP, as well as the methods so far proposed for preventing the formation of lower oxides by performing sintering in a pressurized oxygen atmosphere have had the following difficulties:

(1) the volatile components in the oxide powder will evaporate during sintering to cause weight loss or produce pores in the sinter being formed, thereby reducing its density; and (2) hot pressing, HIP and the sintering in pressurized oxygen require more investment than normal sintering and hence involve increased manufacturing costs, thereby imposing constraints on the effort to produce larger targets.

SUMMARY OF THE INVENTION

An object, therefore, of the invention is to provide a process capable of producing high-density and large sinters by normal sintering without employing expensive equipment as in hot pressing and sintering in pressurized oxygen while ensuring that the volatile components in the starting powders will not cause weight loss or produce pores during sintering which would otherwise reduce the density of the sinter being formed.

Another object of the invention is to provide starting powders for ITO production by the process mentioned above.

Yet another object of the invention is to provide ITO sinters suitable for use as sputtering targets for the formation of transparent and electrically conductive films.

As a result of the intensive studies conducted in order to attain the stated objects, the present inventors found the following: if a starting powder for ITO production contains more than 30 ppm of halogens, the sinter being formed will not have a sufficient density; if tin oxide is not in a fully oxidized state, the tin oxide component will evaporate during heating as in normal sintering to produce pores which prevent the sinter being formed from acquiring a sufficient density. Based on these findings, the present inventors specified the starting salts, precipitant and the conditions for reaction, calcination, etc. such as to synthesize a starting oxide adapted to be free from volatile components such as halides and lower oxides, dispersed the starting oxide to particles having a specified size distribution, granulated the particles into a powder having a specified flowability, pressed the powder into a compact and sintered the compact in either an air atmosphere or an oxygen-rich atmosphere to thereby produce a large and high-density sinter for use as an ITO sputtering target.

Thus, according a first aspect of the invention, there is provided an indium oxide powder having a halogen content of no more than 30 ppm and a specific surface area of at least 15 m$^2$/g.

There is also provided a tin oxide containing indium oxide powder having a halogen content of no more than 30 ppm, and a specific surface area of at least 15 m$^2$/g.

The first mentioned indium oxide powder may be mixed with a tin oxide powder and the resulting tin oxide containing indium oxide powder is conditioned to have a $D_{50}$ of no more than 1 μm and $D_{90}$ of no more than 3 μm determined by laser scattering measurement and further conditioned to have an average particle size of 30–80 μm.

The second mentioned tin oxide containing indium oxide powder may be conditioned to have a D50 of no more than 1 μm and $D_{90}$ of no more than 3 μm determined by laser scattering measurement and further conditioned to have an average particle size of 30–80 μm.

There is also provided a tin oxide containing indium oxide powder having a halogen content of no more than 30 ppm, a specific surface area of at least 15 m$^2$/g and an average particle size of 30–80 μm.

The tin oxide containing indium oxide powders may be an aggregate of secondary particles not larger than 3 μm.

The tin oxide containing indium oxide powders may have an angle of repose of no more than 25 degrees.

The tin oxide in the tin oxide containing indium oxide powders may be substantially stannic oxide.

According to a second aspect of the invention, there is provided an ITO sinter produced by pressing one of the above-described tin oxide containing indium oxide powders into a compact and sintering the compact in either air atmosphere or an oxygen-rich atmosphere.

The sinter may have a thickness of no more than 14 mm, an area of at least 1,000 cm$^2$ and a relative density of at least 90%.

The ITO sinter may have a thickness of no more than 14 mm, an area of at least 1,000 cm$^2$ and a relative density of at least 90%.

According to a third aspect of the invention, there is provided an ITO sputtering target made of any one of the sinters described above.

According to a fourth aspect of the invention, there is provided a process for producing an indium oxide powder or a tin oxide containing indium oxide powder, comprising the steps of providing an indium nitrate solution or a solution containing a mixture of indium nitrate and tin nitrate, neutralizing either solution by adding either an alkali carbonate or an alkali bicarbonate or both at a temperature of no higher than 60° C., drying the resulting precipitate and calcining the dried precipitate in either an air atmosphere or an oxygen-rich atmosphere.

There is also provided a process for producing a tin oxide containing indium oxide powder which comprises the steps of providing either a mixture of a tin oxide powder with an indium oxide powder having a halogen content of no more than 30 ppm and a specific surface are of at least 15 m$^2$/g or a tin oxide containing indium oxide powder having a halogen content of no more than 30 ppm and a specific surface area of at least 15 m$^2$/g, conditioning either powder to have $D_{50}$ of no more than 1 μm and $D_{90}$ of no more than 3 μm determined by laser scattering measurement and further conditioning the powder to have an average particle size of 30–80 μm and an angle of repose of no more than 25 degrees.

The adjustment of the $D_{50}$ and $D_{90}$ may be performed by wet dispersing and the adjustment of the average particle size and the angle of repose may be performed by granulation through spray drying of a slurry.

According to a fifth aspect of the invention, there is provided a process for producing an ITO sinter comprising the steps of providing a tin oxide containing indium oxide powder having a halogen content of no more than 30 ppm, a specific surface area of at least 15 m$^2$/g, an average particle size of 30–80 μm and an angle of repose of no more than 25 degrees, pressing the powder into a compact and sintering the compact in either an air atmosphere or an oxygen-rich atmosphere.

DETAILED DESCRIPTION OF THE INVENTION

Various examples of actually practicing the invention will be explained below in detail. Methods of producing raw material powders will be described first.

A solution of indium nitrate having an indium concentration of 50–120 g/L is held at 35–50° C. while an alkali carbonate or bicarbonate is added as a neutralization precipitant in an amount 1.2–3.0 times the equivalent amount, thereby allowing an indium compound to precipitate.

The precipitate is dried, disintegrated and calcined to yield an indium oxide powder having a specific surface area of 15–50 m$^2$/g as measured by the BET method.

The indium oxide powder thus obtained is admixed with the desired amount of tin oxide to obtain a tin oxide-containing mixed powder as a raw material.

Various requirements for preparing a raw material powder will be explained below. First, the reason why indium nitrate is used as a starting indium salt will be given. Based on experiments we have found that if a sinter is produced by using an ITO powder prepared by the method which contains the step of producing indium chloride or tin chloride, there is a tendency that the resulting sinter has a decreased level of density.

The present inventors conducted experiments in which chlorine was deliberately added to starting powders and found that indium oxide powders having a Cl content of no more than 30 ppm had good sintrability and yielded sinters having relative densities of 90% and more. However, an indium oxide powder having a Cl content of 60 ppm had poor sintrability and could only yield a sinter having a relative density of less than 90%. A probable reason for this phenomenon would be that during sintering, chlorine combines with In and Sn to form compounds which evaporate, thereby interfering with the progress of sintering. This made us consider that if components which may volatalize at a sintering range of temperatures, particularly above 800° C. remain in the raw material powder, the sintering will be deteriorated. Particularly, the presence of a halogen element is undesirable.

The halogen content of the starting material for ITO production is also specified in the invention in order to ensure the production of high-density sinters. The purity of ITO sputtering targets is generally at least 99.99% for each of In, Sn and O and care is also exercised in the prior art to prepare the starting powder such that it is contaminated by the smallest possible amount of impurities; however, no reference has been made to chlorine and other halogens that will evaporate during the production of sinters.

Therefore, if indium nitrate is used as a starting indium salt instead of other conceivable salts such as indium chloride and sulfate, sinterability will not be deteriorated, because nitrate ions may decompose at relatively low temperatures even if they remain in the powder.

Further, in the process of the present invention, a halogen pickup, particularly chloride ion pickup in any of the indium salt, precipitant and water inclusive of washing water during the step of the formation of the precipitate is so much exhaustively avoided that the resulting indium oxide may contain no more than 30 ppm, preferably no more than 20 ppm of the halogen or chloride ion.

Actually, say, in the case of preparing indium nitrate, preferably no less than 4N (four-nine) indium metal is leached with a heated solution of preferably reagent grade nitric acid, followed by dilution with ion exchange resin-purified water to obtain a solution of the desired concentration, which is neutralized by the addition of a predetermined amount of preferably a reagent grade precipitant to obtain precipitate, which is filtered and washed. The purified water used in the above process should preferably be one from which ions have been removed to the level of at least 1 MΩ in its resistivity by passing through a bulk of ion exchange resins or by any other effective means. Alkali carbonates and bicarbonates which can be used as neutralization precipitant in the practice of the present invention include carbonates and bicarbonates of sodium, potassium and ammonia, with ammonium carbonate and ammonium bicarbonate being most preferred.

The precipitant is used in an amount 1.2–3.0 times the equivalent weight in the interest of economy and the possibility of completely neutralizing indium salts. The resulting precipitate is considered to be a compound mainly comprising indium carbonate. If the temperature of the solution is increased to above 60° C., an undesired compound mainly comprising indium hydroxide will be obtained. As regards the temperature of a solution, even such a low temperature as less than 35° C. is enough to form a precipitate. However since the precipitate is obtained in fine grains, operational difficulties will increase in the subsequent filtration and washing stages. Thus, temperatures in the range of 35–60° C. are preferred.

The reason why the former precipitate is preferred is that the latter precipitate, which mainly comprises indium hydroxide, is more difficult to be disintegrated at the stage where the precipitate is dried and the specific surface area of the oxide obtained by calcining the precipitate tends to become smaller than when the precipitate composed of indium carbonate is dried and disintegrated and the resulting precipitate is calcined to obtain indium oxide.

In a comparative experiment, an indium nitrate solution having an indium concentration of 100 g/L was kept at 35–50° C. while aqueous ammonia was added as a precipitant, thereby synthesizing indium hydroxide, which was dried and sintered to yield indium oxide. However, the product was a very hard lump which was difficult to grind into satisfactory indium oxide particles.

As regards the concentration of indium nitrate in the solution thereof, if it is low, production rate will also be low. On the other hand, if it is unduly high, it will be difficult to control the operation because of high reaction rate and only an ununiform precipitate will be obtained. Accordingly, the concentration in the range of 50–120 g/l will be preferred.

The resulting precipitate is then filtered and washed by using apparatuses such as a filter press, a centrifugal dehydrator or the like, followed by drying, disintegrating and calcining. The oxide of the present invention is easy to disintegrate and has good crushability. By changing the temperature at which said calcining is effected, the surface area of the resulting raw material powder can be controlled.

If the calcining temperature is less than 500° C., nitrate ions or volatile components such as moisture will remain in the powder. When sinters are produced from the compact formed by this powder, the remaining components may become a cause to produce sinters having fractures and cracks. Further disadvantages are that the specific surface area may exceed 50 $m^2/g$, the powder has an increased cohesive strength, and the viscosity increases when dispersed in a wet system. This is undesirable because satisfactory dispersion cannot be obtained due to high viscosity. Calcinating at a temperature exceeding 800° C. is also undesirable because the binding between the powder particles advances to result in the specific surface area of less than 15 $m^2/g$ and the sinterability is deteriorated.

The indium oxide powder thus obtained is mixed with in oxide by using a V-shaped mixer, a ribbon mixer or the like. Mixing may also be effected in the subsequent wet dispersing process.

The amount of tin oxide to be incorporated in the powder mixture should be determined so as to meet the desired tin content in the final product of ITO sinter. The tin oxide content in the ITO sinter is in the range of 2–20 wt %, in terms of $SnO_2$. Generally, the amount in the range of 5–15 wt % in terms of $SnO_2$ is satisfactory.

The proportion of tin oxide to be used in the preparation of the mixed powder is in the range of 2–20 wt % in terms of $SnO_2$, though in some instances the proportion of tin oxide is within 5–15 wt % in terms of $SnO_2$. For these reasons, the halogen element content and the specific surface area of the tin oxide may be such that after mixing with indium oxide the halogen element content in the mixed powder is no more than 30 ppm and the specific surface area of the mixed powder is at least 15 $m^2/g$. As for the tin oxide to be used for this purpose, stannic oxide is preferred. This is because stannous oxide (SnO) is easy to evaporate during the stage of sintering. In the experiments conducted by the present inventors in which a starting powder containing 10 wt % stannous oxide was calcined, no good sinters were obtained.

Tin oxide can also be prepared in a similar manner as in the case of indium oxide by making a precipitate from an aqueous solution of tin nitrate by the addition thereto of alkali carbonate or alkali bicarbonate, followed by drying and calcining.

On the other hand, indium-tin complex oxide raw material powder can be prepared by the following procedures.

Tin nitrate is added to a solution of indium nitrate and alkali carbonate or alkali bicarbonate is added to the resulting mixture in a similar manner as in the case of the solution of indium nitrate mentioned above and the solution is agitated, while the temperature is maintained in the range of 35–50° C. to obtain a precipitate presumably mainly comprising indium and tin carbonates. It is a matter of course that desirably high purity reagents and pure water should be used to carry out the above reaction in order to avoid the contamination with halogen element.

In this alternative case, tin nitrate is added in an amount commensurate with the tin content of the ITO sinter to be finally obtained; therefore, the tin oxide content of the ITO sinter as the final product will lie within the range of 2–20 wt %, typically 5–15 wt %, in terms of $SnO_2$. Hence, the conditions for precipitation, as well as the conditions for drying and calcination steps are substantially identical to the case of processing the indium nitrate alone and the resulting mixture of indium and tin oxides will also have similar properties to the indium oxide taken alone.

The precipitate thus formed is dried and calcined at 500–800° C. to a tin oxide containing indium oxide powder having a specific surface are of 15–50 m²/g.

The tin oxide-containing indium oxide thus obtained shows, upon being examined by X-ray diffraction method, a peak of $In_2O_3$ (in which Sn is dissolved in the form of a solid solution) and a peak of $SnO_2$, part of which is not dissolved. No peak of SnO is observed.

The indium oxide-tin oxide mixed powders or the indium-tin complex oxides powder obtained by the above mentioned procedures are dispersed with a wet bead mill or the like to prepare a slurry containing particles having a $D_{50}$ of no more than 1 μm and $D_{90}$ of no more than 3 μm determined by laser scattering measurement.

The size control of particles dispersed in the slurry is accomplished by means of the milling power which varies depending on the apparatuses, types of beads used, dispersing time, rotating speed, vibration frequency and the like. The solid content of the slurry which can be employed conveniently is approximately in the range of 30–60%.

The reason why the particle size distribution was predetermined to be such that $D_{50}$ should be no larger than 1 μm and $D_{90}$ should be no larger than 3 μm is because one of the purposes for doing so is to attain adequate distribution of tin oxide. According to the tests by the present inventors, when a sinter was prepared using a tin oxide powder comprising coagulated particles larger than 3 μm in size, coagulated lumps of tin were observed via SEM photograph on the raptured surface of the resulting sinter.

On the other hand, when a sinter was prepared using a tin oxide powder comprising dispersed particles of no larger than 3 μm, preferably no larger than 2 μm in size, uniform structure was observed on the raptured surface of the resulting sinter upon examination thereof. The second purpose for doing so is to avoid the presence of coagulated particles of indium oxide, ITO or the like. If they were present, abnormal growth of grains would occur during calcination at the coagulated portions and would cause pores remaining in the coagulated portions. As a result, the density of the sinter as a whole would not be increased or only a sinter of uneven density would be formed. As for the method of dispersion, though a dry process is also employable in which dispersion is accomplished by using a vibrating mill, etc, the grinding (or dispersion) efficiency is inferior to the wet process. In addition, since a spray drying step exists as a subsequent step, a slurry must be formed from a dry powder and therefore the powder is required to have good affinity with a solvent to be used. For these reasons, wet dispersion is preferred for the practice of the present invention. As a dispersion medium, ion-exchange resin purified water having an electric resistivity of 1 MΩ or more is used.

This slurry is spray dried to obtain granules having an average particle size of 30–80 μm determined by the observation of a SEM photograph. The granulated powder thus obtained was observed by a SEM photograph and was found to comprise coagulated lumps of secondary particles no larger than 3 μm in size. In the process of spray granulation, granule size distribution is controlled by various factors inclusive of the slurry condition, drying temperature, air quantity, pressure difference in a dryer and the device conditions of a spraying device (i.e., the disc diameter and the rotating speed, etc. in the case of the disc-rotation type spraying device), feed rate of the slurry, etc. These factors also affect the fluidity of the granuled powder. Operational factors of the spray dryer should be controlled in such a way that the angle of repose as an indicator of the fluidity of the product powder may be no greater than 25 degrees, preferably no greater than 22 degrees.

The reason why the angle of repose is important is as follows. In the case when a sinter with an area of 1000 cm² or so is to be obtained, shaping without cracks can be effective by using a powder whose angle of repose is in the range of 20–25 degrees. If a sinter within area of 2000 cm² or so is to be obtained, the use of a powder whose angle of repose is at least in the range of 22–23 degrees is critical. If a powder whose angle of repose exceeds 23 degrees is used, ununiform filling is easy to occur in the shaped powder. In contrast, if a powder whose angle of repose is no greater than 22 degrees is used, shaping of the powder for obtaining a sinter with an area of no less than 2000 cm² can be effect without problems.

As for the means for granulation, spray granulation is considered to be desirable. The reason is that the spraying method is more easy to obtain granulated particles having good fluidity than the compressing granulation method. In addition, when granules are pressed to form a compact, the product by the former method is easier to be destroyed than the product of the latter method. As a result, a compact having increased density is easily obtained and in turn cavities remaining between the granules are less likely to occur during the stage of sintering. Thus, in the former method high density sinters are more likely to be obtained.

As regards the size of granules, if an average granule size determined by the observation of a SEM photograph is less than 30 μm, the angle of repose of such granuled powder will exceed 25 degrees and the powder is undesirable. In an average granule size determined by the same manner as above exceeds 80 μm, the sinterability of such granuled powder will be impaired and therefore the powder is undesirable. Even after the granule size is adjusted to an average granule size of 30–80 μm, the specific surface area will remain within the range of 15–50 m²/g, which is almost the same as that in the step before the mixing.

Indium-tin oxide (ITO) is a difficult-to-sinter material and if a compact prepared by pressing it is sintered in air atmosphere without taking any particular precaution, it sometimes occurs that the sinter being formed will not have an increased density or, alternatively, pores will remain in the central part of the sinter, causing the density of the surface to differ from that of the interior.

While many methods have been proposed with a view to preventing these phenomena, hot pressing, HIP and sintering in pressurized oxygen are particularly effective. However, these methods can only be implemented with expensive equipment and in order to produce large sinters, the initial cost is exorbitant to warrant the application of these methods to the production of large sinters.

In order to avoid this problem of high initial cost, the present invention sinters a compact in either an air atmosphere or an oxygen-rich atmosphere at an atmospheric pressure, thereby enabling the production of a high-density sinter. Stated briefly, the thickness of the compact and the particle size distribution of the slurry prepared by wet dispersing are appropriately adjusted to reduce the unevenness in the density of the sinter being formed. Stated more specifically, a powder prepared by one of the methods described hereinabove is dispersed by a wet method such that the particles in dispersion have $D_{50}$ of no more than 1 μm and $D_{90}$ of no more than 3 μm determined by laser scattering measurement; subsequently, the particles are spray dried to form a granulated powder having an average particle size of 30–80 μm under examination by SEM and an angle of repose of no more than 25 degrees; the granulated powder is pressed into compact at 0.5 tons/cm$^2$, then subjected to secondary molding by CIP (cold isostatic pressing) at a pressure of 1–3 tons/cm$^2$; the compact is subsequently sintered at 1,400–1,600° C. for 5–20 hours in an oxygen-rich ($O_2 \geq 90\%$) atmosphere at an atmospheric pressure, whereupon a sinter having a relative density of at least 98% is typically produced in dimensions of 426 mm×530 mm×13 mm$^t$. The relative densities of the produced sinters have been determined based on the assumption that the theoretical density of ITO which contains 10% $SnO_2$ is 7.155 g/cm$^3$, which has been determined based on the assumption that the theoretical densities of $In_2O_3$ and $SnO_2$ are 7.18 g/cm$^3$ and 6.93 g/cm$^3$, respectively, and that In and Sn are contained in ITO in the form of a mixture of $In_2O_3$ and $SnO_2$. Since the density of the sinter tends to increase with increasing density of the compact, the higher molding pressure would be favored. The density of the compact after pressure molding should be no less than 45%, preferably no less than 50%. The density can be controlled by varying the applied molding pressure. Even if raw material having good breakability is used, high density sinters would not be obtained when the molding pressure is not high enough to fully break the granules, because satisfactory sintering does not proceed between the granulated particles and pores remain between them.

Even if adequate control is performed throughout the manufacturing process from the preparation of a starting powder or powders up to the stage of sintering, unevenness in temperature and other defects that occur in the sintering step can potentially produce scattering in the density profile of the sinter. To preclude this possibility, the present invention introduces an additional requirement for limiting the thickness of the sinter to 14 mm and less.

Calcination can be accomplished in an air atmosphere, or in an atmosphere of a mixed gas of air and oxygen, or in a mixture of oxygen and an inert gas such as $N_2$ and Ar, or in an atmosphere of pure oxygen. The concentration of oxygen is preferably no less than 20%. The density of a sinter tends to increase with increasing concentration of oxygen. However, there is no need to use compressed oxygen atmosphere. If calcination is effected in a reducing atmosphere, or in vacuo, the sinter will be in the reduced state, and the amount of oxygen-deficit will increase. Thus, no good sinter will be obtained.

The sinters produced by the process described hereinabove were cut and polished to sputtering targets, which were set up in a sputtering machine and evaluated for their performance during film formation by sputtering. Blackening and subsequent formation of nodules which would affect the sputter rate and the quality of the film being formed occurred to only a limited extent and the target life was such that the desired film could be formed on a fairly consistent manner from the initial to the end phase. In addition, the ITO films formed were satisfactory in characteristics such as specific resistance and light transmittance.

EXAMPLE 1
1. Conditions for Preparing Indium Oxide:
Metallic indium of 4N (99.99%) purity was dissolved in hot nitric acid to obtain a solution of indium nitrate. The solution was diluted to have a concentration of In of 100 g/L. Maintaining the solution of indium nitrate at a temperature in the range of 35–40° C., ammonium carbonate as a neutralisation precipitant was added thereto in an amount 1.5 times the equivalent weight to obtain a precipitate, which was separated from the solution and washed by using a filter press, and the precipitate was dried in an air atmosphere at 150° C. for 15 hours, followed by crushing the dried product with a hammer mill.

The crushed powder was calcined in an open air at 500° C. for 20 hours to obtain an indium oxide powder.

To carry out the above reaction, reagent grade chemicals were used as reactants and water used was one purified by the ion exchanging method having an electrical resistivity of 5 MΩ.

The indium oxide thus obtained had a purity of 99.99% or more, and the halogen element content thereof was les than 10 ppm. The indium oxide powder had a specific surface area of 45 m$^2$/g determined by the BET method.

2. Conditions for Preparing Granuled Powder:
Tin oxide (stannic oxide) having the halogen (Cl) content of 30 ppm and a specific surface area of 4 m$^2$/g was mixed in a V-shaped mixer with the indium oxide referred to hereinabove in such a manner that the proportion of tin oxide in ITO may become 10 wt % in terms of $SnO_2$. Then, the resulting raw material powder was mixed in a rotation-type bead mixer (Mitsui Mining Co., Ltd. Atliter) with ion exchange resin-purified water in the proportion of 40 parts powder to 60 parts water to effect dispersion treatment for 1 hour with a rotation speed of 500 rpm for obtaining a slurry. The slurry was examined by the laser dispersion type particle size distribution measuring device. The dispersed particles were found to have $d_{50}$ of 0.8 μm and $d_{90}$ of 1.7 μm, where $d_{50}$ represents such particle size that 50% in accumulated weight percentage of particles are no larger than $D_{50}$, and $d_{90}$ represents such particle size that 90% in accumulated weight percentage of particles are no larger than $D_{90}$.

The slurry thus prepared was spray dried by using a disc rotation type spray drier (SD19 available from Mitsui Mining Co., Ltd. having a disc diameter φ of 80) to granulate. The granuled particles whose average particle size determined by the observation of SEM photograph is 50 μm and having an angle of repose of 23 degrees were obtained.

In the operation of the spray drier, various operational factors inclusive of the disc rotation speed, the temperatures of feed and exhaust gases, air quantity, and the feed rate of the slurry are controled so that the granuled particles having the desired particle size and fluidity may be obtained.

In the experiment mentioned hereinabove, the disc rotaion speed was 1000 rpm, and the air quantity was adjusted in such a manner that the pressure difference in the tower was –13 mm $H_2O$, the temperature of feed air was 180° C., the temperature of exhaust air was 80° C., and the feed rate of the slurry was 8 l/hr.

3. Compaction and Calcining
The granlued powder prepared by the procedures mentioned above was filled in a metallic mold (575×726×16) and pressed under applied pressure of 0.5 t/cm$^2$ by using an oil press to provide a temporality shaped product, which is subsequently compacted by means of CIP at a pressure of 2 t/cm$^2$. The density of the resulting compact was 52% in terms of a relative density. This compact was calcined in an electric furnace at an atmospheric pressure at 1550° C. for 15 hours. The sinter having a size of 430 mm×530 mm×12 mm$^t$ and a relative density of 90.2% was obtained. Peripheral and central portions of the sinter thus obtained were cut into small pieces having a size of 30 mm×30 mm×12 mm and the resulting pieces were subjected to the measurement of the densities. It was found that the scattering of the relative densities was within ±1.0% (n=10).

EXAMPLE 2

Ammonium bicarbonate was used as a neutralizing agent and calcining was effected at 580° C. to obtain $In_2O_3$. Except for using $In_2O_3$ thus obtained, granulation, compaction and calcination were conducted in the same flow as in Example 1. sinters were prepared in the same procedures as in Example 1 except that the calcining atmosphere was oxygen-rich ($O_2$ 90%) gas flow.

EXAMPLE 3

Sinters were produced according to the same production flow as in Example 2 except that the starting powder was prepared in the form of indium-tin complex oxides from indium nitrate and tin nitrate. The indium-tin complex oxides thus obtained was subjected to X-ray diffraction measurement. No peak of SnO was observed.

EXAMPLE 4

Sinters were produced according to the same production flow as in Example 2 except that in the production of the starting powder, calcining temperature was 750° C. and the specific surface area of the powder was set to become 15 $m^2/g$.

COMPARATIVE EXAMPLE 1

Procedures of Example 2 were repeated except that in the process of preparing granulated particles, $NH_4Cl$ was added to obtain ITO having incorporated therein 60 ppm of Cl and the resulting ITO was used as the starting powder.

COMPARATIVE EXAMPLE 2

Procedures of Example 1 were repeated except that in the preparation of the starting powder, ammonia was used as a neutralizing agent and due to the poor disintegrating property, particle size of solids in the slurry was large.

Experimental conditions and characteristic properties of the powders handled in Examples 1–4 and Comparative Examples 1–2 are shown in Table 1.

EXAMPLES 5–10

Samples of sintered ITO were produced under the conditions set forth in Table 2. In Example 5, an indium oxide powder prepared as in Example 2 to have a specific surface area of 32 $m^2/g$ and a halogen content of no more than 10 ppm was mixed with a tin oxide powder having a halogen (Cl) content of 30 ppm and a specific surface area of 4 $m^2/g$ in an amount of 10% as tin oxide in the ITO sinter to be finally obtained; the resulting mixture was dispersed with a wet bead mill to form a slurry containing particles having $D_{50}$ of 0.8 μm and $D_{90}$ of 2.0 μm determine by laser dispersion measurement. The slurry was spray dried to prepare a granulated powder, with the temperature, air flow and other operating parameters of the spray dryer being adjusted such that the granulated powder would have an average particle size of 60 μm under examination by SEM and an angle of repose of 23 degrees. Subsequently, the granulated powder was subjected to primary molding at a pressure of 0.5 tons/$cm^2$, then secondary molding by CIP at a pressure of 2.5 tons/$cm^2$ and sintered at a temperature of 1,550° C. for 15 hours in a 95% $O_2$ atmosphere at an atmospheric pressure, thereby yielding an ITO sinter having a relative density of 98.0% in a size of about 400×500 mm (=2,000 $cm^2$) with a thickness of 13.4 mm (see Table 2).

In Examples 6–10, the procedure of Example 5 was repeated except on the values of $D_{50}$ and $D_{90}$ determined by the laser scattering measurement after dispersing, as well as the average particle size under examination by SEM and the angle of repose which were adjusted by controlling the operating parameters of the spray dryer (see Table 2).

COMPARATIVE EXAMPLES 3 AND 4

The procedure of Example 5 was repeated except on the values of $D_{50}$ and $D_{90}$ determined by the laser scattering measurement after dispersing, as well as the average particle size under examination by SEM and the angle of repose which were adjusted by controlling the operating parameters of the spray dryer (see Table 2).

TABLE 1

|  | Example | | | | Comparative Example | |
|---|---|---|---|---|---|---|
|  | 1 | 2 | 3 | 4 | 1 | 2 |
| Conditions for Producing Starting Powder | | | | | | |
| Starting solution | $In(NO_3)_3$ | $In(NO_3)_3$ | $In(NO_3)_3$ $Sn(NO_3)_4$ | $In(NO_3)_3$ | $In(NO_3)_3$ | $In(NO_3)_3$ |
| Concentration, g/L | In 100 | In 60 | In 92 Sn 8 | In 100 | In 80 | In 100 |
| Reaction temp., ° C. | 35–50 | 40–45 | 35–40 | 35–40 | 35–40 | 35–40 |
| Neutralizer-precipitant | $(NH_4)_2CO_3$ | $NH_4HCO_3$ | $NH_4HCO_3$ | $NH_4HCO_3$ | $NH_4HCO_3$ | $NH_4OH$ |
| Calcination temp., ° C. | 500 | 580 | 580 | 75- | 580 | 500 |
| Characteristics of Starting Powder | | | | | | |
| Form of raw material | $In_2O_3$ +$SnO_2$ mixed powder | $In_2O_3$ +$SnO_2$ mixed powder | InSn comlex oxides | $In_2O_3$ +$SnO_2$ mixed powder | $In_2O_3$ +$SnO_2$ mixed powder | $In_2O_3$ +$SnO_2$ mixed powder |
| Specific surface area of oxide, $m^2/g$ | 45 | 30 | 39 | 15 | 32 | 40 |
| Halogen (Cl) content, wt. ppm | <10 | <10 | <10 | 20 | 60 | <10 |
| Addition of $SnO_2$, wt % | 10 | 10 | (10) | 10 | 10 | 10 |
| Characteristics of Slurry | | | | | | |

TABLE 1-continued

|  |  | Example | | | | Comparative Example | |
|---|---|---|---|---|---|---|---|
|  |  | 1 | 2 | 3 | 4 | 1 | 2 |
| Diameter by laser scattering measurement, μm | $D_{50}$ | 0.8 | 0.6 | 0.7 | 0.8 | 0.7 | 1.1 |
|  | $D_{90}$ | 1.7 | 1.6 | 1.9 | 1.7 | 1.9 | 3.5 |
| Characteristics of Granulated Powder | | | | | | | |
| Particle size of granulated powder, μm | | 50 | 60 | 50 | 40 | 50 | 60 |
| Angle of repose, degree | | 23 | 20 | 20 | 23 | 22 | 20 |
| Characteristics of Compact | | | | | | | |
| Compact density, % | | 50 | 52 | 53 | 51 | 52 | 50 |
| Conditions for Sintering | | | | | | | |
| Sintering temperature, °C. | | 1550 | 1550 | 1550 | 1550 | 1550 | 1550 |
| Sintering time, hr | | 15 | 15 | 15 | 15 | 15 | 15 |
| $O_2$ content in sintering atmosphere, vol. % | | 21 | 90 | 90 | 93 | 21 | 21 |
| Characteristics of Sinter | | | | | | | |
| Relative density of sinter. % | | 91.2 | 99.0 | 92.0 | 96.5 | 85.3 | 83.4 |
| Scattering of sinter denisty, % | | ±1.0 | ±0.2 | ±1.0 | ±0.4 | ±1.5 | ±2.0 |

TABLE 2

|  |  | Example | | | | | | Comparative Example | |
|---|---|---|---|---|---|---|---|---|---|
|  |  | 5 | 6 | 7 | 8 | 9 | 10 | 3 | 4 |
| Dispersion time, hr | | 1 | 1.5 | 1.5 | 2 | 2 | 1.5 | 0.5 | 0.5 |
| Diameter by laser scattering measurement, μm | $D_{50}$ | 0.8 | 0.7 | 0.7 | 0.6 | 0.5 | 0.7 | 0.8 | 0.9 |
|  | $D_{90}$ | 2.0 | 1.7 | 1.7 | 1.4 | 1.6 | 1.7 | 3.2 | 3.5 |
| Conditions for granulation | | | | | | | | | |
| Disc rotation speed, rpm | | 12,000 | 10,000 | 10,000 | 10,000 | 10,000 | 10,000 | 10,000 | 10,000 |
| Pressure difference. in tower, mmH$_2$O | | −15 | −13 | −13 | −8 | −15 | −15 | −2 | −8 |
| Particle size of granulated powder, μm | | 32 | 40 | 40 | 40 | 40 | 40 | 40 | 40 |
| Angle of repose, degrees | | 23 | 22 | 23 | 23.3 | 19.2 | 17.1 | 26.8 | 24.2 |
| $O_2$ content in sintering atmosphere, vol. % | | 95 | 95 | 95 | 95 | 95 | 95 | 95 | 95 |
| Thickness of sinter, mm | | 13.4 | 11.9 | 10.8 | 12.5 | 11.7 | 11.4 | 11.5 | 11.7 |
| Density of sinter, % | | 98.0 | 98.7 | 99.3 | 97.2 | 97.2 | 97.8 | 94.2 | 92.3 |
| Appearance of sinter | | good | good | good | good | good | good | crack | good |

According to the method of the invention, by selecting the precipitant for use in the synthesis of starting materials and by setting appropriate conditions for the manufacturing process starting with the synthesis of ITO starting powders, going through shaping into a compact and ending with the sinterable step, easily sintrable powders are obtained and, at the same time, the contamination by specified impurities and volatile compounds is prevented to ensure against the formation of pores during sintering. In addition, the fluidity of the powders is sufficiently enhanced to enable the production of sinters from large compacts and not only the average size of the particles in the granulated powder but also the thickness of the compact is adjusted such as to enable the production of sinters of very high density at atmospheric pressure.

What is claimed is:

1. An indium oxide powder for producing an ITO sinter, having a halogen content of no more than 30 ppm and a specific surface area of 15 to 50 m$^2$/g as measured by the BET method.

2. A tin oxide containing indium oxide powder for producing an ITO sinter, produced by a process comprising adding a tin oxide powder to the indium oxide powder of claim 1, conditioning the resultant mixed powder to have a $D_{50}$ of no more than 1 μm and a $D_{90}$ of no more than 3 μm determined by a laser scattering measurement, and further conditioning the mixed powder to have an average particle size of 30–80 μm.

3. A tin oxide containing indium oxide powder for producing an ITO sinter, produced by a process comprising conditioning the tin oxide containing indium oxide powder of claim 2 to have a $D_{50}$ of no more than 1 μm and a $D_{90}$ of no more than 3 μm determined by a laser scattering measurement, and further conditioning the powder to have an average particle size of 30–80 μm.

4. A tin oxide containing indium oxide powder according to claim 2, which has an angle of repose of no more than 25 degrees.

5. A tin oxide containing indium oxide powder according to claim 2, which has an average particle size of 30–80 μm.

6. A tin oxide containing indium oxide powder for producing an ITO sinter, having a halogen content of no more than 30 ppm and a specific surface area of 15 to 50 m$^2$/g as measured by the BET method.

7. A tin oxide containing indium oxide powder according to claim 2, which is an aggregate of secondary particles not larger than 3 μm.

8. A tin oxide containing indium oxide powder according to claim 3, which is an aggregate of secondary particles not larger than 3 μm.

9. A tin oxide containing indium oxide powder according to claim 3, which has an angle of repose of no more than 25 degrees.

10. A tin oxide containing indium oxide powder according to claim 6, wherein the tin oxide in said powder is substantially stannic oxide.

11. A tin oxide containing indium oxide powder according to claim 6, which is an aggregate of secondary particles not larger than 3 μm.

12. A tin oxide containing indium oxide powder according to claim 6, which has an angle of repose of no more than 25 degrees.

* * * * *